United States Patent

[11] 3,581,176

[72] Inventors Geoffrey James Bigg
   Cholsey;
   Alistair Michael Heaslett, Reading, both of,
   England
[21] Appl. No. 753,418
[22] Filed Aug. 19, 1968
[45] Patented May 25, 1971
[73] Assignee Ampex Corporation
   Redwood City, Calif.

[54] SYSTEM FOR DRIVING ELECTRIC MOTORS
   2 Claims, 1 Drawing Fig.
[52] U.S. Cl. .................................................. 318/327
[51] Int. Cl. .................................................. H02p 5/16
[50] Field of Search .......................................... 318/341,
   327, 345

[56] References Cited
   UNITED STATES PATENTS
3,371,258  2/1968  Brown .......................... 318/345
3,458,792  7/1969  Jabbar .......................... 318/341

Primary Examiner—Oris L. Rader
Assistant Examiner—Thomas Langer
Attorney—Robert G. Clay ABSTRACT: Closed loop servosystem in which an electric motor is driven by or in accordance with signals representing the difference between the actual speed of the motor and a desired nominal speed only if the actual speed is below the nominal speed. The system comprises means for providing trigger signals of a frequency in accord with motor speed, a bistable circuit which when in one state provides an output signal to drive the motor, means responsive to the trigger signals to put the bistable circuit in said one state after a predetermined time has elapsed from receipt of a trigger signal and to switch the bistable circuit to its other state on receipt of each trigger signal.

PATENTED MAY 25 1971
3,581,176
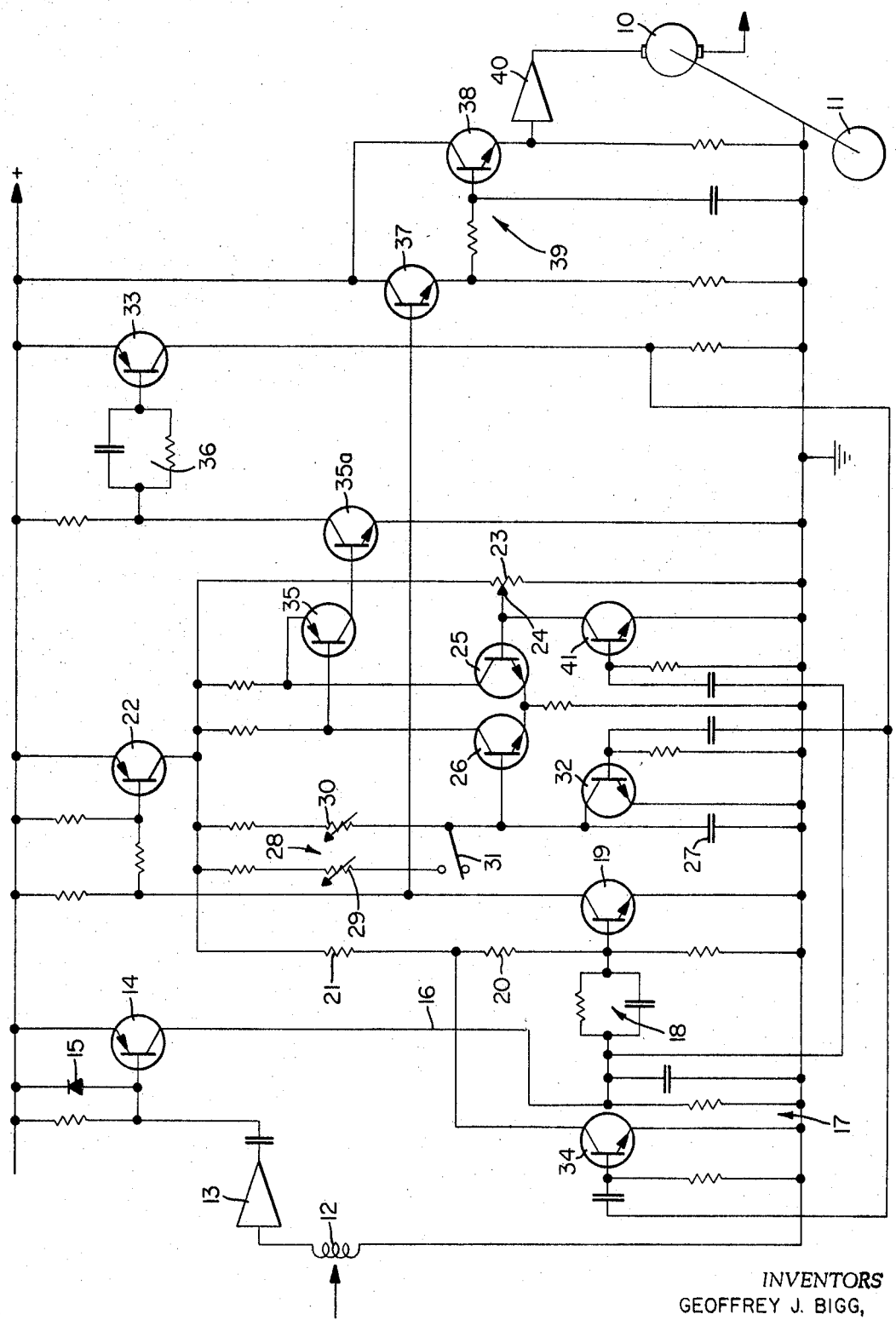
INVENTORS
GEOFFREY J. BIGG,
ALISTAIR M. HEASLETT
BY Thomas E. Schatzel
ATTORNEY

SYSTEM FOR DRIVING ELECTRIC MOTORS

This invention relates to systems for driving electric motors.

It is known to drive an electric motor at a variable speed by means of electrical pulses whose 54 ratio or whose instantaneous repetition frequency varies in accordance with the desired speed of the motor. Motors capable of being driven in this fashion will be called hereafter "motors of the kind described," which phrase includes motors for which the pulses are smoothed and optionally amplified before being applied to drive the motor.

In a number of systems, particularly but not exclusively magnetic tape recording and reproducing apparatus, the motor may be required to move at a fairly constant speed. For example, the motor may be used to drive a capstan to draw tape past a magnetic transducing head and it is well known that the tape-to-head speed under these conditions ought to be maintained sensibly constant. However, due to variations in tension on the tape and a number of other factors, the loading on the motor varies and quite considerable speed variations may occur. Thus it is desirable to control the speed of the motor via a closed loop system which drives the motor in accordance with the difference between the actual speed of the motor and a desired nominal speed. The invention particularly relates to a system in which discriminating action is employed, that is to say the motor is driven by or in accordance with signals representing the difference between the actual speed of the motor and a desired nominal speed only if the actual speed is below the nominal speed.

According to the invention, a system for driving an electric motor of the kind described comprises means for providing trigger signals whose instantaneous frequency varies in accordance with the speed of the motor, a bistable circuit arranged, when in one state only, to provide an output signal capable of causing the motor to be driven, means responsive to the trigger signals to put the bistable circuit in the said one state after a predetermined time has elapsed from the receipt of a trigger signal and to switch the bistable circuit to its other state on receipt of each trigger signal.

With the present invention, the length of each output signal will represent the difference between the actual speed of the motor and a "nominal" speed, which would produce trigger signals spaced apart by said predetermined time. Thus the motor may be driven for longer periods the lower its speed below the "nominal" speed. If, however, the motor's speed is above the nominal speed, then the bistable circuit remains in its other state, since a trigger signal is received before the aforementioned predetermined time has elapsed, and the motor is not energized again until its speed falls below the nominal speed.

The means responsive to the trigger signals conveniently comprises a timing circuit arranged when reset and restarted to generate a timing signal or duration representative signal which varies from a datum at a predetermined rate (preferably exponentially) with time, the timing circuit being reset and restarted each time a trigger signal occurs, the bistable circuit being set in said one state when the timing signal reaches a predetermined value. With this construction, the trigger signals, which may be derived from a tachometer generator driven by the motor, each start the timing circuit, which may be a charging circuit. If the timing signal reaches the aforementioned predetermined value before being reset, the bistable circuit provides an output capable of causing the motor to be driven. In practice, there may be provided a comparator comparing the amplitude of the timing signal with a predetermined value and controlling the bistable circuit accordingly.

There may be provided means for smoothing any output signal from the bistable circuit before the output signal is applied to drive the motor.

The following is a description, with reference to the accompanying drawing, of one embodiment of the present invention.

The accompanying drawing illustrates a drive system for a motor 10 which is itself arranged to drive a capstan for a magnetic tape in a magnetic recording and reproducing apparatus. Coupled on the shaft of the motor 10 is a tachometer disc 11 cooperating with a coil 12 to produce a sinusoidal signal whose instantaneous frequency represents the speed of the motor. The frequency may be equal to the frequency of rotation of the motor or may be a harmonic or subharmonic thereof. The sinusoidal signal from the tachometer coil 12 is amplified and squared by an amplifier 13 and fed to the base of a PNP transistor 14. The base of the transistor is shunted by a diode 15 to the positive supply line and the output line 16 from the collector is shunted by a differentiating network 17. Trigger signals are provided by positive going edges of the squared waveform appearing at the output line 16 of transistor 14. The output line 16 is connected through a parallel RC network 18 to the base of a NPN transistor 19 and via resistors 20 and 21 to the collector of a PNP transistor 22. The transistors 19 and 22 form a complementary bistable circuit in which both transistors are nonconducting until a positive going signal arrives at the base of the transistor 19. The collector of the transistor 22 is coupled via a potentiometer 23 to the negative line, the slider 24 of the potentiometer 23 being connected to the base of an NPN transistor 25 which with an NPN transistor 26 forms a longtailed pair circuit.

By adjusting the position of the slider 24 the voltage towards which a capacitor 27 is charged and hence the rate of charging is varied.

The collectors of both transistors 25 and 26 are coupled through resistors to the collector of transistor 22. The base of the transistor 26 is coupled to the midpoint of a charging circuit comprising the capacitor 27 and a resistive circuit 28. The resistive circuit shown is in two branches containing adjustable resistors 29 and 30, a switch 31 being provided to shunt the branch containing resistor 30 by the branch containing the resistor 29 if desired. The other end of the circuit 28 is connected to the collector of the transistor 22. Across the capacitor 27 is coupled the collector-emitter circuit of an NPN transistor 32 whose base is coupled to the collector of a PNP transistor 33 and to the base of a transistor 34 whose emitter-collector circuit is connected between the earth line and the junction of resistors 20 and 21. A transistor 35 has its emitter-base circuit connected between the collectors of transistors 25 and 26 and its collector feeding the base of a further transistor 35a whose collector feeds via a parallel RC input circuit 36 the transistor 33. From the collector of the transistor 19 a line extends to the base of a transistor 37 whose collector is coupled to the collector of a transistor 38 and whose emitter is connected via an integrating circuit 39 to the base of the transistor 38. The emitter of transistor 38 feeds an amplifier 40 providing drive current for the motor 10.

The line 16 also feeds the base of a transistor 41 whose collector is connected to the slider 24. Hence, trigger signals are also provided to the base of the transistor 41. Since the trigger signals are provided by positive going edges of the squared waveform appearing at the output line 16, transistor 41 will conduct each time a trigger signal is generated. When transistor 41 conducts the base of transistor 25 is brought down towards the potential of the grounded line. If capacitor 27 is charged to any extent, the potential at the base of the transistor 25 will be less than that at the base of transistor 26. As described hereinafter, when the potential at the base of transistor 26 reaches or exceeds that at the base of transistor 25, the feedback loop comprising transistors 35, 35a, 33 and 32 operates to discharge the capacitor 27. Thus, transistor 41 insures that the capacitor 27 will be discharged each cycle of the tachometer signal regardless of the speed of the motor 10.

The operation of the described circuit is as follows.

When a positive going signal appears on the line 16, the transistor 19 conducts and is held conducting by its complementary transistor 22. This causes a rise in voltage on the base of transistor 26, the rate of rise being determined by the time constant of the charging circuit 27 and 28. When the voltage at the base of transistor 26 reaches that which is set on to the base of transistor 25 by the slider 24 of potentiometer 23 (which has a substantial voltage across it when transistor 22 conducts), the transistor 35 will be turned "on." This initiates, via the transistors 35 and 33 a positive going edge at the collector of transistor 33. This positive going edge is fed back to the bases of transistors 32 and 34. The transistor 32 rapidly discharges the timing capacitor ready for another cycle whereby another duration representative signal is generated in response to the receipt of a trigger or reference signal. The transistor 34 switches off transistor 19 and consequently transistor 22. However, it will be appreciated that if the discharge of the capacitor 27 is initiated by virtue of the operation of transistor 41, a positive trigger will be present at the base of transistor 19 at the time transistor 34 receives the positive going edge. The presence of this trigger signal prevents transistor 34 from switching off transistor 19. Therefore, transistor 19 will not operate to cause drive current to be issued to the motor 10 as described below. The positive going edge on the collector of transistor 19 is fed to the output emitter follower comprising transistors 37 and 38. The output from the emitter follower, which is amplified by the amplifier 38, remains at a high positive value until another trigger signal (i.e. positive going edge) is supplied from transistor 14. This turns transistors 19 and 22 on and the output from the transistor 38 (which is determined by the voltage at the collector of transistor 19) falls to a value insufficient to cause the motor to be driven. However, since the transistors 19 and 22 are now conducting, the cycle of operation just described repeats.

The following discussion summarizes the operation of transistor 32 in insuring the discharge of capacitor 27 prior to the initiation of each timing cycle. When the duration between successive positive triggers is greater than the predetermined length, transistor 33 operates to turn on transistor 32, thereby rapidly discharging capacitor 27. Since transistor 34 is also turned on by the operation of transistor 33 and a positive trigger is not present at the base of transistor 19, both transistors 19 and 22 are turned off until the next positive trigger of the successive triggers is received. Hence, capacitor 27, remains discharged and thereby is conditioned for charging during the next timing cycle. However, if the duration between successive positive triggers is less than the predetermined length, transistor 41 responds to the second of the successive positive triggers to cause transistors 25, 26, 35, 35a and 33 to operate and turn on transistor 32. As explained immediately above, the operation of transistor 32 results in the rapid discharge of capacitor 27. While transistor 34 also is turned on by the operation of transistor 41, the presence of a positive trigger at the base of transistor 19 prevents transistor 34 from turning off transistors 19 and 22. Because transistors 19 and 22 remain on, capacitor 27 is allowed to be charged immediately following completion of its discharge as a result of the operation of transistor 41.

In practice, the time constant provided by the charging circuit would be adjusted so that the length of the positive going output from the emitter follower would be zero if the motor 10 were moving at its required speed. Under these conditions, if the motor speed fell below the required speed it would be fed with pulses of fixed amplitude but of duration and frequency increasing with the deviation of the actual speed from the nominal speed. However, if the motor increased in speed then all driving power to the motor would be cut off so that it slowed to the nominal speed and below.

The pair of transistors 37 and 38 form a bistable circuit in the sense that they are in one (conductive) state or another (cutoff) state according to the potential at the collector of transistor 19. It will be apparent that various modifications may be made here and elsewhere in the circuit. For example, the "bistable circuit" could comprise a circuit of the Eccles-Jordan type and the timing circuit could comprise a monostable multivibrator.

We claim:

1. A system for maintaining the speed of a motor at a desired nominal value of the kind described comprising, in combination:

means for providing reference signals at a rate varying in accordance with the speed of the motor;

a timing circuit responsive to the reference signals to initiate the generation of a separate duration representative signal each time a reference signal is received;

a bistable circuit when arranged in one state only provides an output signal capable of causing the motor to be driven;

means responsive to the duration representative signal when this signal represents a duration of at least a predetermined length to set the bistable in said one state until the next reference signal is received;

means responsive to the setting of the bistable circuit in the said one state to condition the timing circuit for the generation of a duration representative signal; and means responsive to the reference signals to condition the timing circuit for the generation of a duration representative signal when the duration between successive reference signals is less than the predetermined length.

2. A system as claimed in claim 1 in which the timing circuit comprises a ramp generator responsive to each of the reference signals to initiate a duration representative signal which varies in amplitude from a datum at a predetermined rate, the predetermined duration of the duration representative signal being the time required for it to reach a predetermined amplitude, the bistable circuit setting means is responsive to the duration representative signal reaching the predetermined amplitude to set the bistable circuit in the said one state, and the ramp generator is responsive to the reference signal responsive means for conditioning the timing circuit to be conditioned for the generation of a duration representative signal when the duration between successive reference signals is less than the predetermined length.